United States Patent Office 3,559,040
Patented Jan. 26, 1971

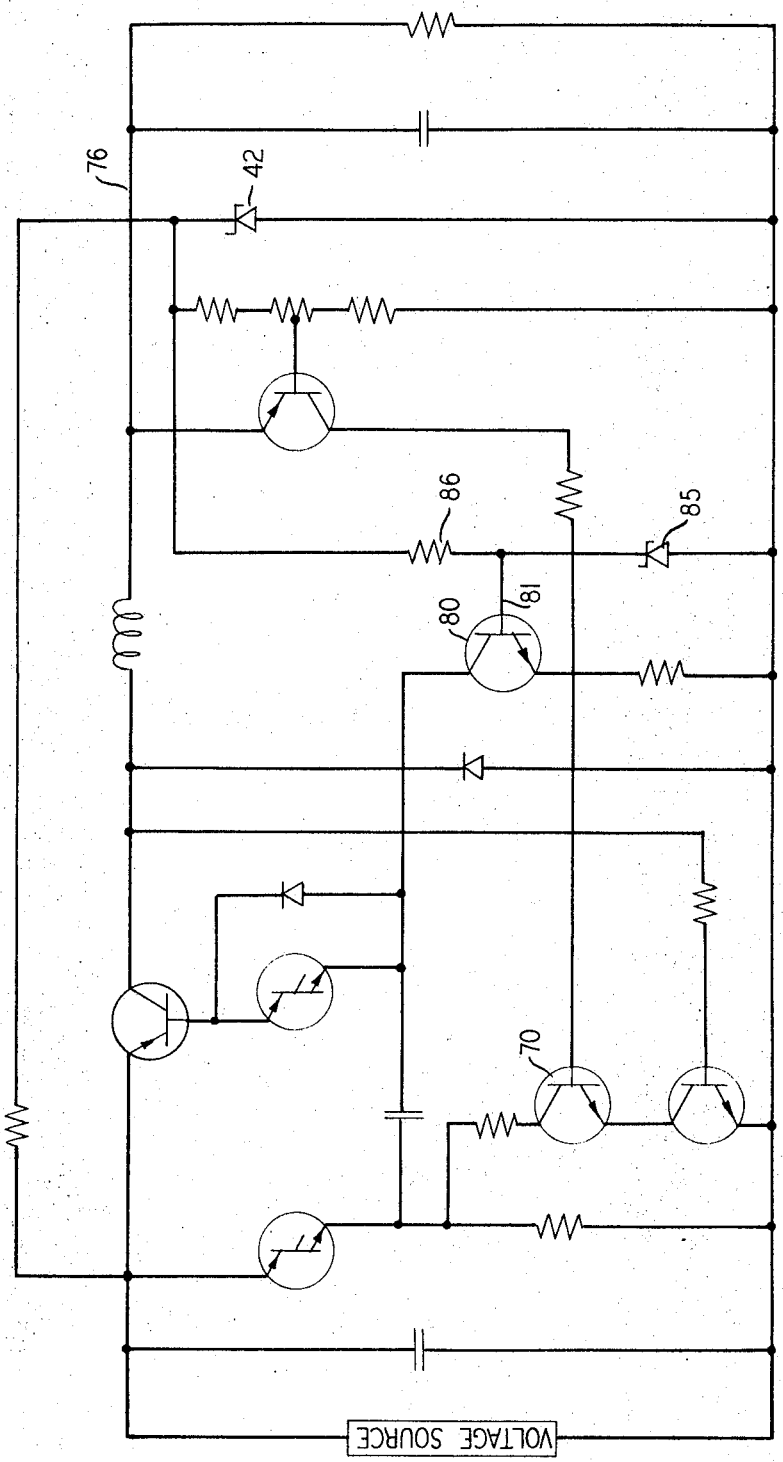

3,559,040
SWITCHING TYPE VOLTAGE REGULATOR
UTILIZING PNPN DIODES TO REDUCE
SWITCHING TRANSITION TIME
Hermann Fickenscher, Morristown, N.J., assignor to Bell
Telephone Laboratories, Incorporated, Murray Hill and
Berkeley Heights, N.J., a corporation of New York
Filed Aug. 27, 1969, Ser. No. 853,246
Int. Cl. G05f 1/56; H02m 3/32
U.S. Cl. 323—22                                     8 Claims

ABSTRACT OF THE DISCLOSURE

A switching type voltage regulator includes bistable devices in the regenerative circuit which controls the switching of the switching device of the regulator. The bistable devices rapidly transfer bias voltages from the storage device in the regenerative circuit to the switching device to reduce its switching transition time and therefore reduce power consumption therein.

BACKGROUND OF THE INVENTION

This invention is related to voltage regulators and more particularly to switching type voltage regulators. It is primarily concerned with the efficient utilization of the switching device in a switching type voltage regulator.

Series type voltage regulators are classified into impedance element type regulators and switching type regulators. The impedance element type voltage regulator utilizes a variable impedance coupling an unregulated source of voltage to an electrical apparatus to be powered by the source. The magnitude of the variable impedance is continuously adjusted to maintain the voltage output of the regulator at a uniform amplitude. Switching type voltage regulators utilize a switching device to couple the unregulated source of voltage to the electrical apparatus. The switching device alternately enables and disables the transmission of energy supplied by the unregulated source to the electrical apparatus. The rate at which the switching device periodically enables transmission is controlled to maintain the voltage output of the regulator at a uniform amplitude.

Switching type regulators operate at higher efficiency than do the impedance element type regulators. In the impedance element type regulators, a considerable amount of the transmitted energy is dissipated in the variable impedance device. In the switching type regulator, very little of the transmitted energy is dissipated in the switching device because the switching device ideally transmits energy with a very low impedance.

The switching device most commonly used in the switching type regulator is a switching transistor. The switching transistor in its saturated state conducts electrical current at a very low impedance and in its cutoff or nonconducting state conducts only a negligible current at a very high impedance. The respective conducting states of the switching transistor in a switching type regulator are controlled by a switching control circuit which applies the switching bias signals to the switching transistor.

A suitable switching control circuit may utilize a regenerative circuit including an energy storage device to provide the switching control. The charge and discharge times of the energy storage device determine the frequency of switching. Energy storage devices such as capacitors require a specific time to charge or discharge from one voltage level to another. If a switching transistor is being switched in response to the change in voltage level on a capacitor, a finite transition time exists during the switching from cutoff to saturation. Hence, power is dissipated in the switching transistor during the finite transition time. This power dissipation limits the amount of power that a switching regulator can regulate with a given switching transistor.

It is an object of the invention to reduce the power dissipation in switching type regulators.

It is another object of the invention to reduce the switching transition time of the switching transistor in a switching type regulator.

It is yet another object of the invention to rapidly switch a switching transistor from a nonconducting state to a saturated state with a regenerative circuit arrangement with the switching transition time independent of the charging and discharging rate of the energy storage device.

SUMMARY OF THE INVENTION

Therefore, in accord with the present invention, a switching transistor is utilized to intermittently couple a source of unregulated voltage to an electrical apparatus to be supplied with a regulated voltage. The switching of the switching transistor is controlled by the repetitive charging and discharging of a timing capacitor. Two PNPN diodes are respectively coupled in the charging and discharging paths of the timing capacitor. The one PNPN diode transmits current to discharge the capacitor and when conducting biases the switching transistor to render it nonconducting. The second PNPN diode transmits a charging current to the capacitor and is connected in the base circuit of the switching transistor. The second PNPN diode in switching into conduction momentarily transfers a large bias voltage to the switching transistor and rapidly switches it into a saturated conducting state. This rapid switching transition reduces the power dissipation during the switching transition of the switching transistor.

A feature of the switching type regulator according to the invention is the utilization of a PN diode shunting the second PNPN diode and poled in an opposite conductivity direction. This permits a rapid application of the bias signal transmitted by the first PNPN diode to the switching transistor to rapidly bias it into its non-conducting state.

An advantage of the switching type regulator according to the invention is that the operation of the switching regulator is independent of the holding current characteristics of the two PNPN diodes. This advantageously improves the stability of operation of the regulator. Its operation hence is not adversely affected by changes in the characteristics of the PNPN diodes due to temperature variations and other environmental conditions.

An additional advantage of the switching type regulator according to the invention is that it operates at a substantially constant frequency if the output regulated voltage is an order of magnitude less than the unregulated input voltage supplied to it.

BRIEF DESCRIPTION OF THE DRAWING

Many additional objects, features, and advantages of the invention will become apparent upon a study of the following detailed description of the invention comprising the following specification and the accompanying drawings wherein:

FIG. 3 is a schematic of an illustrative embodiment of a switching type regulator incorporating the principles of the invention and having a substantially constant switching frequency.

DETAILED DESCRIPTION

Figure 1:
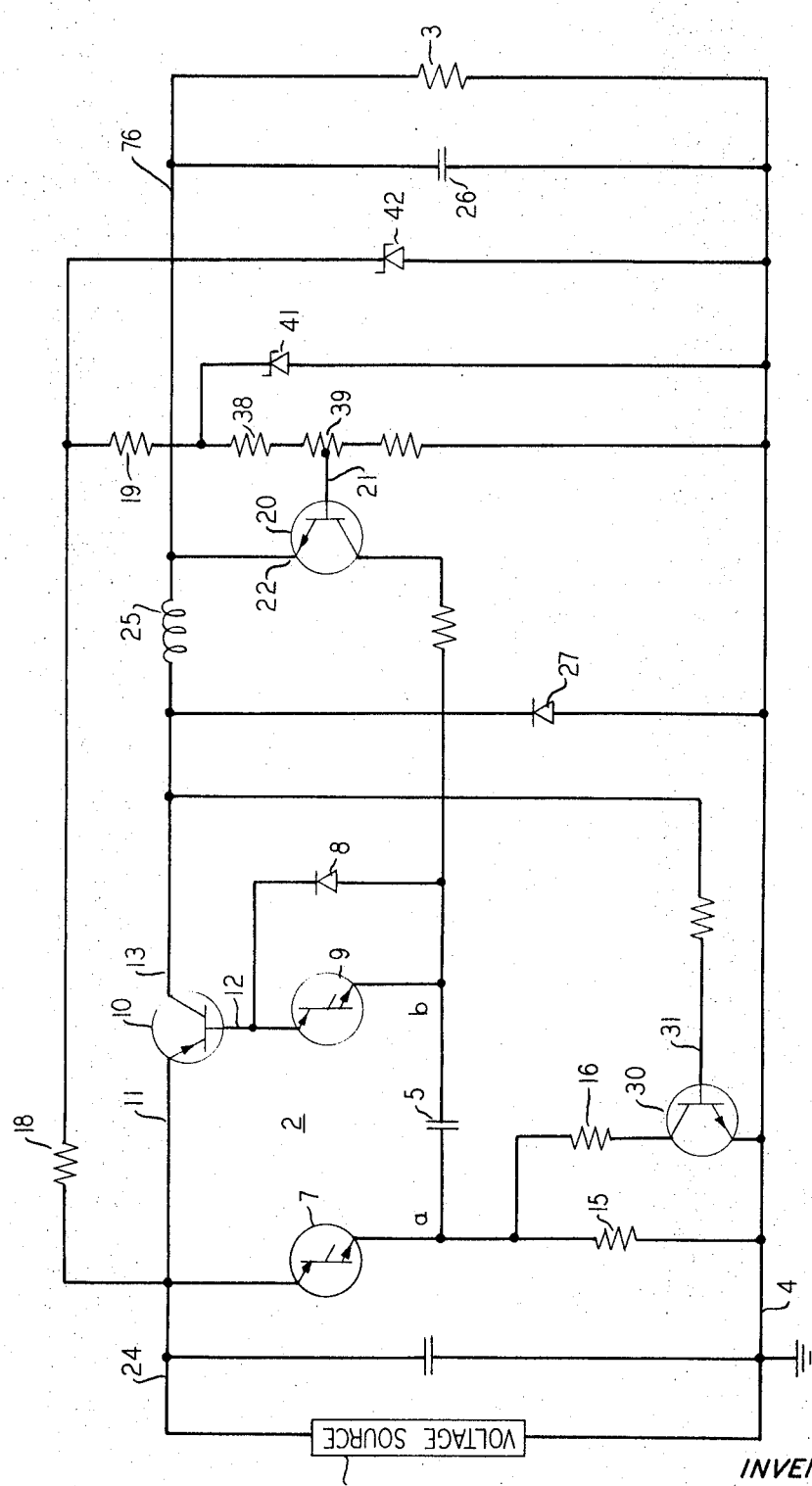
FIG. 1 is a schematic of an illustrative embodiment of a switching type regulator incorporating the principles of the invention.

The switching type voltage regulator disclosed in FIG. 1 accepts an unregulated voltage from voltage source 1, regulates this voltage by periodically switching the switching transistor 10 into a saturated conduction state, and applies this regulated voltage to the output load represented by the resistive impedance 3. The switching of the switching transistor 10 is controlled by a regenerative timing circuit 2 which periodically switches the transistor 10 into a saturated conduction state in response to the charging and discharging of the capacitor 5.

The principles of the invention may be readily illustrated by explaining the operation of the switching regulator. The operation of the regulator is described herein for a typical cycle of operation with the switching transistor 10 initially conducting in its saturated state. With the switching transistor 10 saturated, energy is coupled from the unregulated voltage source 1 to the output load 3 through the transconductive or collector-emitter path of the saturated switching transistor 10. Additionally, a current flows through its emitter-base path and the conducting PNPN diode 9 to charge the capacitor 5. This current exceeds the holding current level necessary to maintain conduction in the PNPN diode 9. The electrical characteristics of PNPN diodes are well documented and hence are not further discussed herein. The charging path for the capacitor 5 is completed to a common point such as ground 4 by the parallel connection of resistor 15 and the series connected resistor 16 and transistor 30. The transistor 30 has its base 31 coupled to the collector 13 of the switching transistor 10. The base drive supplied to transistor 30 from the collector 13, when the transistor 10 is saturated, is sufficient to bias the transistor 30 into its saturated conducting state.

A PNPN diode 7 connects the terminal a of capacitor 5 to the emitter 11 of the switching transistor 10 completing a loop which includes PNPN diode 9 and the emitter-base path of transistor 10. As the voltage across the capacitor 5 increases due to the charging current, the voltage impressed upon the nonconducting PNPN diode 7 is increased. When this voltage exceeds a predetermined threshold level the PNPN diode 7 is switched into conduction. At the instant the PNPN diode 7 switches into conduction the voltage supplied by source 1 at input terminal 24 is applied to the near terminal a of the capacitor 5. The voltage at the opposite terminal b of the capacitor 5 instantly increases by an amount equal to the breakdown voltage of the PNPN diode 7. This instant increase of the voltage at terminal b occurs because the voltage across the capacitor 5 cannot change instantaneously. The voltage increase at the opposite terminal b of capacitor 5 is applied, via the foward biased diode 8, to the base 12 of the switching transistor 10. This voltage increase rapidly switches the switching transistor 10 into its cutoff or nonconducting state.

With the switching transistor 10 in its nonconducting state, the base drive applied to the base 31 of transistor 30 is eliminated and the transistor 30 is biased into its nonconducting state. Hence, the resistor 15 controls the magnitude of the current flowing through the PNPN diode 7. The resistance magnitude of resistor 15 is selected to permit a holding current to flow through the PNPN diode 7 to maintain current conduction therein.

The rate of discharge of the charged capacitor 5 is controlled by the impedance of the transistor 20 whose transconductive or collector-emitter path couples the terminal b of the capacitor 5 to the output terminal 76 of the switching regulator. The variable impedance introduced by transistor 20 is responsive to the difference between a reference bias signal applied to its base 21 and the output voltage of the regulator at terminal 76 which is coupled to its emitter 22.

The reference bias signal is derived from the Zener diodes 41 and 42, which are energized by the primary voltage source 1. The Zener diode 42 is coupled, via resistor 18, to the voltage source 1. A resistor 19 couples the junction of resistor 18 and Zener diode 42 to the Zener diode 41. The characteristics of the Zener diodes 41 and 42 are selected to apply a constant voltage drop across resistor 19 to derive a constant current therein. This constant current supplies a fixed base current drive, via the resistors 38 and 39, to the base 21 of the transistor 20. Hence, the transconductive impedance of transistor 20 is responsive to variations in the output voltage of the switching regulator and accordingly the discharging rate of the capacitor 5 is dependent upon the amplitude of the output regulated voltage.

The input voltage applied to input terminal 24 is distributed across the base-emitter junction of transistor 10, PNPN diode 9 and the capacitor 5. As the capacitor 5 discharges through transconductive path of the transistor 20, the voltage across the capacitor 5 decreases and hence the voltage across the PNPN diode 9 increases. When the voltage across PNPN diode 9 exceeds its breakdown potential it switches into conduction.

When the PNPN diode switches into conduction, the voltage drop formerly across the PNPN diode 9, before it switched into conduction, is now suddenly transferred to the base-emitter junction of the nonconducting switching transistor 10. With this sudden application of a large voltage to its base-emitter junction, the switching transistor 10 is rapidly biased into its saturated conducting state. The switching transition speed is advantageously independent of the charging and discharging rate of the capacitor 5. It is apparent from the foregoing that this modified timing circuit rapidly switches the switching transistor from its nonconducting to its saturated state and vice versa thereby permitting very little power dissipation within the switching transistor 10 during the switching transition time.

A filter comprising an inductor 25, a capacitor 26 and a flyback diode 27 is included in the output circuit of the regulator to reduce voltage ripple and improve the continuity of the output current. The operation of such a filter with its included flyback diode is well known in the art and it is not believed necessary to described it herein in detail.

The frequency of operation of the aforedescribed switching regulator is substantially independent of temporary amplitude variations in the voltage supplied by the unregulated voltage source 1, if the input voltage is an order of magnitude greater than the regulated output voltage. This is due to the fact that the rate of discharge of the timing capacitor 5 and hence the cutoff period of the switching transistor 10 is responsive only to the regulated output voltage. Hence, the cutoff time of the switching transistor 10 is substantially constant. The relatively stable cutoff duration is substantially larger than the saturated conducting duration of the switching transistor 10 which varies with input voltage variations. Hence, the frequency of operation will be substantially independent of temporary variations in the voltage supplied by the voltage source 1.

Figure 2:
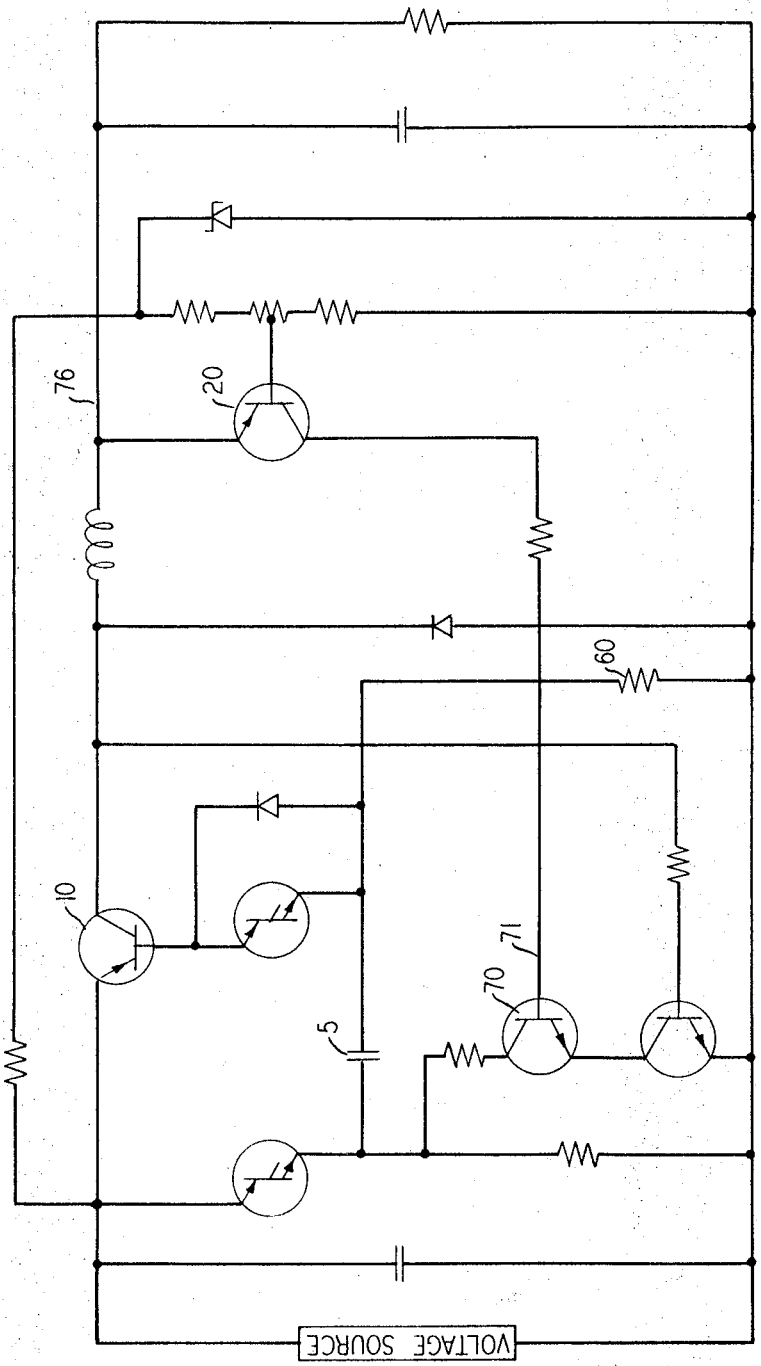
FIG. 2 is a schematic of another illustrative embodiment of a switching type regulator incorporating the principles of the invention.

The switching regulator disclosed in FIG. 2 is designed to operate at a constant frequency independently of temporary variations in the load current. It differs from the switching regulator disclosed in FIG. 1 in the component structure of the charge and discharge paths of the timing capacitor 5. The discharge path of the timing capacitor 5 consists of the fixed impedance 60. The charging path includes an additional variable impedance comprising the transistor 70. The impedance of the transconductive path of transistor 70 is controlled by the base drive supplied to its base 71 by the transistor 20 which in turn is responsive to the regulated output voltage on the output terminal 76.

The charging rate of capacitor 5 during the saturation of transistor 10 is responsive to the regulated output voltage. The rate of discharge of the timing capacitor 5 during cutoff of transistor 10 is not responsive to the requirements of the output load, and hence since the saturation duration is a small part of each cycle the switching frequency of the switching transistor 10 is substantially independent of load current variations.

The operation of the switching regulator disclosed in FIG. 2 is, except for the above-described modification, identical to that of the switching regulator disclosed in FIG. 1, and it is not believed necessary to describe its operation herein in detail.

The switching regulator disclosed in FIG. 3 operates at a substantially constant frequency irrespective of temporary variations in the voltage source 1 or in the load current supplied to the output load 3. The circuit in FIG. 3 includes a constant current source comprising the transistor 80 in the discharge path of the capacitor 5. The transistor 80 is biased by a constant bias current supplied to its base 81 through the resistor 86 which is energized by a constant voltage drop supplied by the Zener diodes 85 and 42. Since the base bias applied to transistor 80 is a constant current, the transistor 80 draws a constant current to discharge the capacitor 5 at a fixed linear rate. The charging of the capacitor 5 is largely regulated by the transconductive impedance of the transistor 70. As described with relation to FIG. 2, this impedance is controlled by transistor 20 which is in turn responsive to the output voltage on the output terminal 76.

It is readily apparent from the foregoing that both the charging and discharging rates of the timing capacitor 5 in FIG. 3 will be substantially independent of temporary variations in the input source voltage and output load current. Hence the switching frequency of the regulator is substantially constant.

The operation of the switching regulator disclosed in FIG. 3 is, except for the above-described modification, identical to that of the switching regulators disclosed in FIGS. 1 and 2, and hence its operation is not described in detail.

What is claimed is:

1. A switching type voltage regulator comprising an input terminal to accept a voltage, an output terminal at which a regulated voltage is supplied, a switching transistor whose transconductive path couples said input terminal to said output terminal, a capacitor, a discharge path for said capacitor including a first PNPN diode coupling said input terminal and the emitter of said switching transistor to one terminal of said capacitor, a charging path for said capacitor including a second PNPN diode coupling the base of said switching transistor to the opposite terminal of said capacitor, whereby said first and second PNPN diodes are alternately biased into conduction to charge and discharge said capacitor, said first PNPN diode when conducting biasing said switching transistor into a nonconducting condition and said second PNPN diode when switching into conduction transferring a voltage drop to rapidly bias said switching transistor into saturation.

2. A switching type voltage regulator as defined in claim 1 further including a constant current source in said discharge path whereby the discharge rate of said capacitor is rendered independent of variations in voltage at said input terminal.

3. A switching type voltage regulator as defined in claim 1 further including a variable impedance in said charging path, said variable impedance comprising an amplifier device whose control electrode is coupled to said output terminal whereby the rate of discharge of said capacitor is responsive to variations in voltage at said output terminal.

4. A switching type voltage regulator as defined in claim 1 further including a PN diode shunting said second PNPN diode and poled in an opposite conducting direction to said second PNPN diode whereby bias signals to cut off said switching transistor are rapidly transmitted to the base of said switching transistor bypassing said second PNPN diode.

5. A switching type voltage regulator comprising an input terminal, an output terminal, a switching transistor whose emitter-collector path couples said input terminal to said output terminal, a charge storage capacitor, a discharging path to apply a discharging current to said storage capacitor including said input terminal, a first PNPN diode, said storage capacitor and a constant current source, a charging path to apply a charging current to said storage capacitor including the emitter base path of said switching transistor, a second PNPN diode, said storage capacitor and a variable impedance responsive to the voltage at said output terminal, the base emitter path of said switching transistor, said first and second PNPN diode and said storage capacitor being connected to form a closed loop whereby the switching action of said first and second PNPN diodes due to the alternate charge level states of said storage capacitor transfers a large bias voltage to rapidly switch said switching transistor independently of the charging rate of said storage capacitor.

6. A switching type voltage regulator as defined in claim 5 wherein said variable impedance comprises a first transistor biased in its active region with its base electrode coupled to said output terminal and said constant current source comprises a second transistor with its base electrode coupled to said input terminal and to a Zener diode to derive a fixed reference bias signal therefrom.

7. A switching type voltage regulator as defined in claim 6 further including a PN diode shunting said second PNPN diode and having its conductivity polarity opposite the conductivity polarity of said second PNPN diode whereby bias signals may be rapidly applied to the base of said switching transistor in a direction opposite the conductivity polarity of said second PNPN diode.

8. A switching type voltage regulator as defined in claim 7 further including a third transistor in said charging path, the base of said third transistor being coupled to the collector of said switching transistor and being biased into its saturation state when said switching transistor is conducting whereby the impedance of said charging path is lowered during the charging of said capacitor.

References Cited

UNITED STATES PATENTS 3,317,820   5/1967   Nylander  ----------- 323—22
3,325,725   6/1967   Nylander  ----------- 323—22

OTHER REFERENCES

Electronics, "Solid State D-C Switched Regulators," pp. 121–123, Nov. 25, 1960.

WILLIAM H. BEHA, Jr., Primary Examiner

U.S. Cl. X.R.

321—2